United States Patent [19]

Perakis

[11] Patent Number: 4,881,667

[45] Date of Patent: Nov. 21, 1989

[54] SIPHON DISPENSER

[76] Inventor: Mike Perakis, 1704 N. Atlantic Ave., Daytona, Fla. 32018

[21] Appl. No.: 69,760

[22] Filed: Jul. 6, 1987

[51] Int. Cl.⁴ ............................................. G01F 11/28
[52] U.S. Cl. ................................... 222/437; 222/456; 222/442
[58] Field of Search ...................... 138/44–45; 222/71, 108–110, 416, 442, 454–456, 478–479, 564, 567, 569, 571, 434, 437

[56] References Cited

U.S. PATENT DOCUMENTS

| | | | |
|---|---|---|---|
| 966,270 | 8/1910 | van Leir | 141/354 |
| 1,862,801 | 6/1932 | Payne et al. | 73/226 |
| 2,193,043 | 3/1940 | Schneider | 222/416 X |
| 2,197,142 | 4/1940 | Cannon et al. | 222/442 |
| 2,248,958 | 7/1941 | Christensen et al. | 222/442 |
| 2,580,292 | 12/1951 | Geary et al. | 222/38 |
| 2,620,947 | 12/1952 | Kucki | 222/455 X |
| 2,689,671 | 9/1954 | Berwick et al. | 222/416 |
| 2,696,933 | 12/1954 | Barclay et al. | 222/564 X |
| 2,820,579 | 1/1958 | Roth | 222/440 |
| 2,980,302 | 4/1961 | Rasmussen | 222/453 |
| 3,081,008 | 3/1963 | Hester | 222/454 X |
| 3,128,915 | 4/1964 | Matter | 222/453 X |
| 3,141,585 | 7/1964 | Emmert | 222/434 |
| 3,184,106 | 5/1965 | Payne | 222/46 |
| 3,193,160 | 7/1965 | Veit et al. | 222/440 |
| 3,246,674 | 4/1966 | Kapeker | 141/14 X |
| 3,321,113 | 5/1967 | Conry | 222/477 |
| 3,630,419 | 12/1971 | Pierce | 222/478 |
| 4,063,666 | 12/1977 | Downing et al. | 222/455 |
| 4,232,711 | 11/1980 | Ray, Sr. et al. | 138/44 |
| 4,258,867 | 3/1981 | Weiler et al. | 222/507 |
| 4,314,657 | 2/1982 | Perakis | 222/162 |

FOREIGN PATENT DOCUMENTS

| | | | |
|---|---|---|---|
| 109586 | 1/1940 | Australia | 222/416 |
| 330759 | 7/1903 | France | 222/416 |

*Primary Examiner*—Michael S. Huppert
*Attorney, Agent, or Firm*—Arthur G. Yeager; Earl L. Tyner

[57] ABSTRACT

An improved siphon dispenser has a hollow body divided into measuring and liquid receiving chambers by a partial partition. A lower neck portion has an air supply tube and a liquid supply tube. An elongated pouring spout is mounted through the body with the inner end positioned within a siphon tube mounted to the partition. A plurality of different length spouts having shoulders intermediate their length provides for accurate releasable mounting in the body via a boss integral to the body and a cap which has threads or, alternatively, a snap fit connection. The air supply tube has a restricted aperture for inhibiting liquid flow while allowing free flow of air. One restricted aperture includes an hourglass-shaped orifice with smooth upper and lower surfaces to minimize draining liquid adhering thereto. Another employs a ball-in-cage affixed to the lower end of the air tube with a lateral aperture above the cage that allows for air flow when in a pouring condition. The ball thus blocks liquid passage by sealing the large lower air tube opening to inhibit liquid flow therethrough. To provide for adequate liquid drainage the lower ball stop is formed by a plurality of spaced triangular-shaped inwardly directed protrusions with small apexes to minimize the surface area contact with the ball.

12 Claims, 2 Drawing Sheets

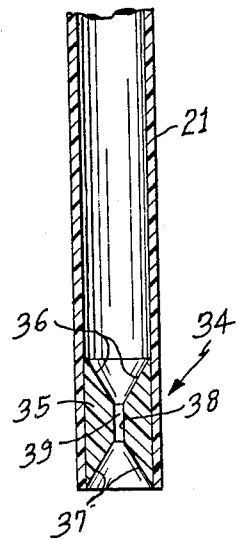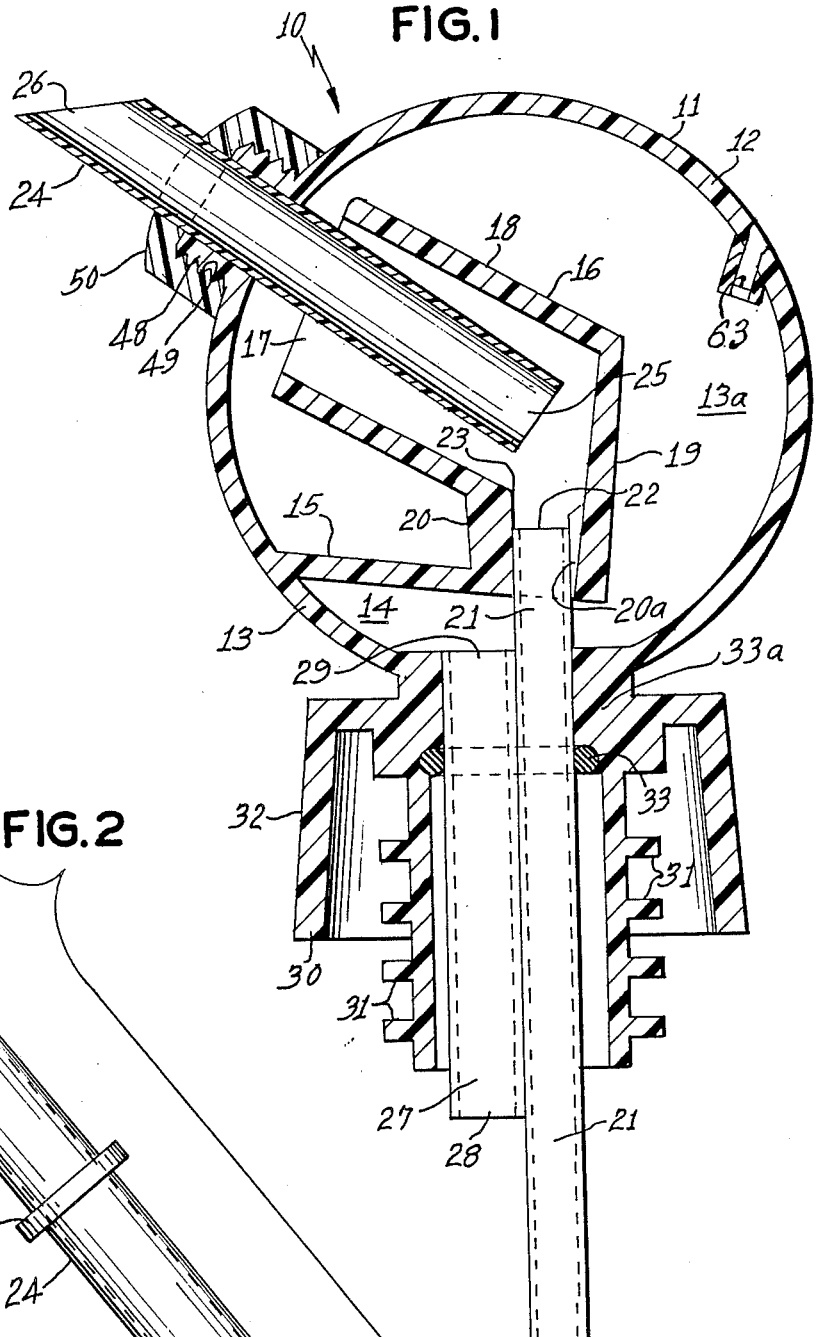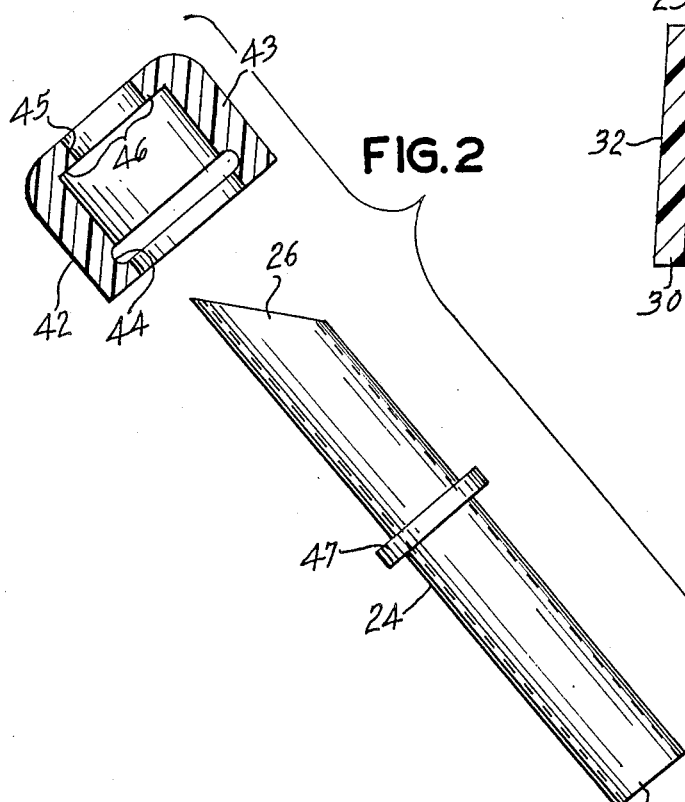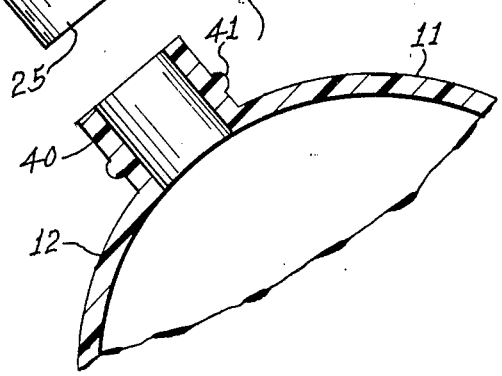

SIPHON DISPENSER

BACKGROUND OF THE INVENTION

1. Field of the Invention

This invention relates to improvements in siphon liquid beverage dispensers and in particular to improvements in the features associated with adjusting the amount of liquid that is poured in a given step and to features that are designed to minimize the clogging when the dispenser is used with high viscosity fluids such as cordials and syrups.

2. Prior Art

There are a wide variety of beverage siphon dispensers known in the prior art. The most severe limitation associated with the majority of the devices is the use of moving parts which can easily be clogged when the device is used to pour mixing syrup, such as grenadine and similar high viscosity liquids. The valves used are easily susceptable to clogging because the liquid can adhere to the valve and seat where it may dry out leaving a gummy residue which will prevent proper operation of the valve. The known prior art is exemplified by U.S. Pat. Nos. 3,630,419; 3,321,113; 3,141,585; 3,128,915; 2,980,302; 2,820,579; 2,580,292; 2,248,958; 2,197,142; and 966,270. Also note the anti-clogging means employed in U.S. Pat. No. 4,314,657.

An additional feature of the siphon dispensers in the prior art is the need to adjust the quantity of liquid poured. For example, it is often desirable to pour 1.0 oz. and 1.5 oz. for given drinks. Methods and apparatus to adjust the poured amounts include U.S. Pat. No. 3,184,106. Such devices, however, may allow unscrupulous bartenders to alter the beverage mix slightly for personal gain and are subject to being clogged, as well as being inaccurate in use.

The present invention relates to improvements in siphon dispensers in order to allow for positive means to alter the measured amount being poured and to do so with a minimum of moving parts for accuracy and inhibition of clogging. In addition, the pourer should be fast-acting. In many instances, a beverage dispenser that is accurate may not be quick enough for use in busy operations. The present invention provides all the above advantages without the disadvantages of the devices of the prior art.

SUMMARY OF THE INVENTION

In one aspect of the invention a siphon dispenser for dispensing liquid from a container in predetermined amounts has a hollow body with an interior partial partition to form a liquid receiving chamber and a measuring chamber communicating with each other and a tubular and vertically disposed lower neck portion communicating between the interior of the body and an aperture of a container holding liquid to be dispensed. An upper elongated tubular pouring spout includes an inner end communicating with the measuring chamber with the body having an air vent communicating between the hollow of the body and exteriorly thereof. Tubular siphon means is located within the body about the inner end of the pouring spout to periodically siphon a predetermined amount of liquid into a serving container. The tubular neck portion includes an elongated air tube having apertured restriction means for readily permitting free flow of air therethrough and inhibiting the free flow of liquid therethrough and in the tubular neck portion there is a tubular fluid conduit communicating with the receiving chamber. The improvement in the aforesaid dispenser is seen to comprise a laterally extending shoulder mounted on the spout at a predetermined distance from the inner end, an outwardly extending boss integral with the body and having a passageway therethrough of a diameter slightly greater than the diameter of the spout, a cap means releasably attached to the boss and having an opening therethrough for accommodating the spout, the shoulder being located beneath the cap means and above the boss whereby the cap means forces the shoulder into tight engagement with the boss.

In other aspects the cap means preferably includes a sealing means in the form of a resilient 0-ring for sealing against the shoulder of the spout and against leakage between the spout and boss. A plurality of pouring spouts may be provided with each dispenser with each spout having a different length of tube between the shoulder and the inner end for selecting the amount of liquid poured from the dispenser with each of the spouts. The pouring spouts also have tapered outer ends for smoother liquid flow therefrom. The boss in one embodiment includes an integral circumferential shoulder and the cap means has an interiorly peripheral notched channel sized to receive the shoulder of the boss to form a snap fit connection when the cap means is pushed downwardly over the boss to secure the spout therein. Alternatively the boss includes exterior threads, the cap means having interior threads sized to engage the boss to secure the spout therein and substantially seal the shoulder to the boss.

Additional aspects are seen wherein the improvements are associated with the aperture restriction means located in the air tube in which is provided an interiorly disposed circumferential shoulder having an inwardly tapered smooth upper surface to minimize the adhesion of liquid thereon when the air tube is in a generally vertical position with any liquid thereon draining therefrom to open and maintain the air tube to the free flow of air therethrough. The circumferential shoulder inhibits the free flow of liquid therethrough so that air may enter a container holding liquid to substantially increase the flow of liquid therefrom during dispensing. Also a means is provided which breaks the surface tension between the restriction adjacent the lower end of the upper surface and liquid which tends to adhere thereto. The tension breaking means may include an inwardly tapered smooth lower surface contiguous with the upper surface, or alternatively it may be an outwardly flared lower surface contiguous with the upper surface.

Further aspects are directed to another embodiment of the aperture restriction means being located adjacent the lower end portion of the air tube and having a ball sized to be freely movable vertically therein, an upper and lower stop means in the lower end portion of the air tube restricts the movement of the ball therein and a lateral aperture located in the tube spaced above the upper stop means permits air to pass more freely into the container to increase the pouring speed of the liquid from the bottle into the dispenser. The lower stop means preferably includes a plurality of spaced inwardly directed protrusions to allow rapid drainage of any liquid contained in the tube into a fluid container onto which the dispenser is mountable. The protrusions are triangular in shape with an inwardly directed apex and are sized to provide minimum surface contact with the ball when the ball is resting thereon to minimize entrapment and adhesion of liquid between the ball and the apex to prevent drying of the liquid therebetween which may interfere with the free motion of the ball during pouring of liquid from the bottle.

BRIEF DESCRIPTION OF THE DRAWINGS

The novel features which are believed to be characteristic of this invention are set forth with particularlity in the appended claims. The invention itself, however, both as to its organization and method of operation, together with further objects and advantages thereof, may best be understood by reference to the following description taken in connection with the accompanying drawings, in which:

FIG. 1 is a cross-sectional view of the siphon beverage dispenser in accord with the present invention;

FIG. 2 is an exploded cross-sectional view of a pouring spout used in the dispenser in accord with an aspect of the present invention;

FIG. 3 is an enlarged cross-sectional view of the air supply tube in accord with a further aspect of the present invention;

DETAILED DESCRIPTION OF THE INVENTION

Figure 4:
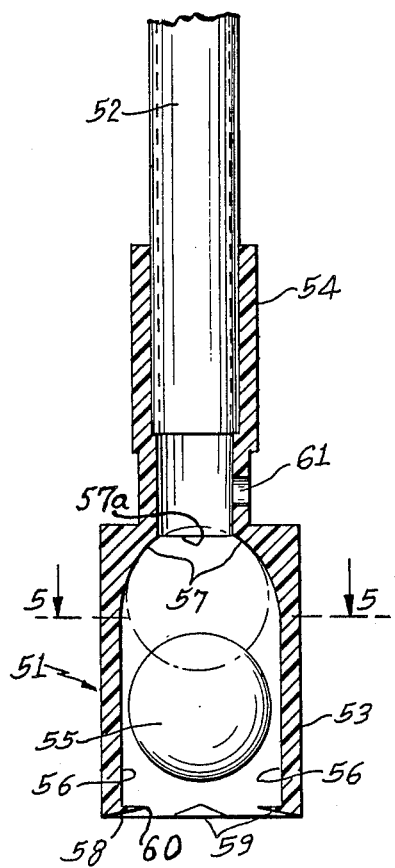
FIG. 4 is an enlarged cross-sectional view of the air supply tube in accord with another aspect of the present invention.

Referring now to the drawings, the siphon dispenser according to the present invention is depicted at 10 in the cross-sectional view of FIG. 1. Siphon dispenser 10 has a bulbous body 11 having integrally connected upper and lower hemispherical portions 12 and 13 respectively, defining an interior space which a partition 15 further defines into a liquid receiving chamber 14 and a measuring chamber 13a. A cylindrical siphon cup 16 is integral to partition 15 and comprises an opening 17, a cylindrical wall 18 and an end portion 19. The lower side of siphon cup 16 is formed into a laterally extending cylindrical projection 20 with an aperture 20a for receiving air supply tube 21 which has upwardly disposed opening 22 located below the edge 23 of wall 18 to allow for liquid in siphon cup 16 to be drained therefrom when the dispenser 10 is in the upright position as illustrated in FIG. 1. Pouring spout 24 fits within and is suspended in the siphon cup 16 and is secured into place through upper body portion 12, as will be more fully described hereinbelow. Spout 24 is preferably a cylindrical tube having inlet opening 25 and outlet 26 which is slant-cut or tapered, as illustrated, for ease of use and free pouring.

Liquid supply tube 27 is generally parallel with air supply tube 21 and has an inlet 28 and outlet 29 communicating with liquid receiving chamber 14. Tubes 21 and 27 may be glued together (but preferably tube 21 is removable for ease of cleaning) and fitted into neck 30 with a plurality of ring-like protrusions 31 adapted to fit within the aperture of a container or beverage bottle (not shown) and providing a near tight seal. Neck 30 functions as a conventional cork with cylindrical collar 32 also aiding in leak prevention during pouring. In the preferred embodiment of the dispenser 10, an internal 0-ring 33 is used to minimize leakage into body 11 around the tubes 21 and 27 in the space between tubes 21, 27 and neck top portion 33a. The neck 30 is integral to body 11 which as a practical matter, are molded in two sections and then glued or welded together as is well understood in the art.

Air supply tube 21 provides air to the beverage container via a restricted aperture depicted generally as 34 in FIG. 3. Aperture 34 is comprised of an interiorly mounted circumferential shoulder 35 within tube 21. The shoulder 35 is formed to provide inwardly tapered upper surface 36; inwardly tapered lower surface 37, and vertical intermediate surface 38 of short length which functions as an orifice opening of generally hourglass shape. Liquid that may remain in siphon cup 16 after a pouring operation can relatively freely drain back into a bottle without adhering to aperture 34 and narrowing the air passage 39 defined by surface 38. Air passage 39 is sized to be large enough to allow an adequate supply of air to enter a beverage bottle during operation of the dispenser 10 and inhibit liquid passage therethrough from the beverage bottle.

Figure 6:
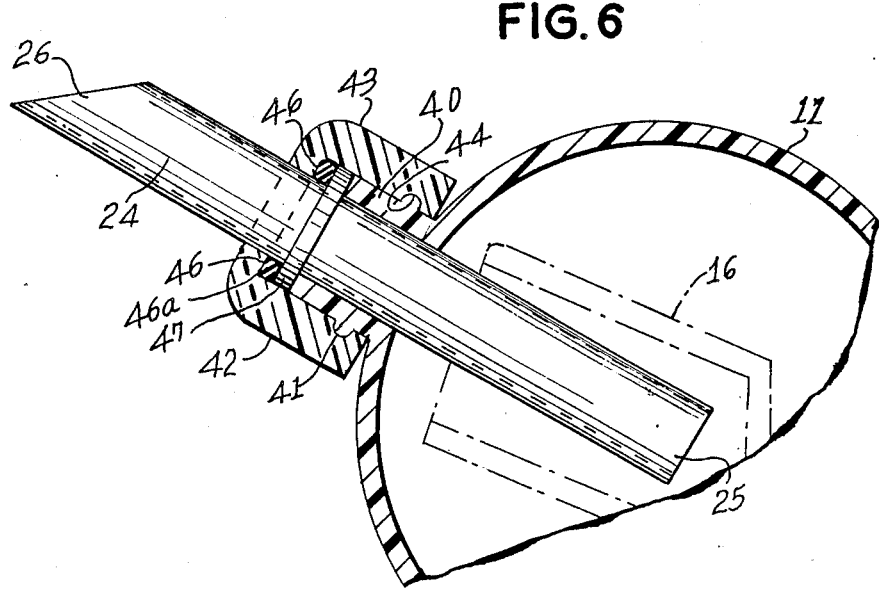
FIG. 6 is a partial cross-sectional view of the pouring spout, seal and cap in accord with an additional aspect of the invention.

Referring now to FIG. 2, one construction for securing the pouring spout 24 to the body 11 of dispenser 10 is illustrated. An outwardly extending boss 40 integral with upper body portion 12 has circular shoulder 41 extending circumferentially thereon. A cylindrical cap 42 has a body 43 with an internal peripheral notched channel 44 sized to fit over and be frictionally engaged with shoulder 41 on boss 40. The cap 42 includes a centrally located aperture 45 sized to accommodate spout 24. The spout 24 is provided with a laterally extending circular and planar shoulder 47 which is forced against the upper internal edge 46 of cap 42 when the cap 42 is secured to boss 40 by a downward snap fit as clearly shown in FIG. 6.

Another construction of securing spout 24 to body 11 is illustrated in FIG. 1. An outwardly extending cylindrical boss 48 is externally threaded at 49 for engaging an internally threaded cap 50 which is tightened downward over and onto boss 48 as illustrated in FIG. 1. The boss 48 and cap 50 are sized to minimize leakage around the pouring spout 24 by frictional engaging spout 24 via the aperture walls in boss 48 and cap 50 as is well understood in the art.

To insure greater inhibition against leakage around the surfaces of boss 40 or 48 and caps 42 and 50 and spout 24, an 0-ring seal 46a may be positioned in the cap which bears against edge 46 to seal against shoulder 47 and/or the upper edge of the boss 40 or 48.

The dispenser 10 includes a plurality of spouts 24 each having a different length as measured from shoulder 47 and inner end at opening 25. A precision fit is assured by the resting of shoulder 47 against edge 46. This feature allows for fast but accurate replacement of one spout 24 with another.

The alternative arrangements for securing the spout 24 to body 11 are best understood in reference to the operation of the dispenser 10.

The dispenser 10 is placed into the opening of a beverage bottle by forcing neck 30 downward into the bottle aperture and providing a leak-tight fit via protrusions 31 which preferably are plastic or some other resilient material forming an effective liquid seal.

When the bottle is tilted downwards to pour liquid into a serving glass, air is provided into the bottle via spout opening 26 and spout 24, and thence by air supply tube 21 into the bottle. Liquid is provided from the bottle into open end 28 of tube 27 and out of end 29 into liquid receiving chamber 14 where the liquid flows around tube 21 and spilling over partition 15 and begins filling body measuring chamber 13a. As the measuring chamber 13a fills with liquid, the liquid level will rise within siphon cup 16 and up to opening 25 of spout 24 and block air flow into supply tube 21 via opening 22 and air cannot enter fluid tube 27 because opening 29 is submerged in chamber 14. As the liquid level covers opening 25 some of the liquid will be entrained with air flowing through spout 24 and will be carried into opening 22 thus providing a rapid shut-off of air being supplied into air tube 21. Liquid will now be siphoned through spout 24 because air will enter body 11 via air vent 63. The liquid will be siphoned until the level thereof drops below the opening 17 of siphon cup 16 at which time the siphon is broken. When the siphon is broken, air will flow into spout 24 almost instantly as any remaining liquid therein leaves via opening 26 and falls into a serving glass. The cycle will then repeat if the bottle is retained in the pouring postion with the vacuum created in the bottle due to liquid flow via tube 27 clearing any liquid which may have been clogging air tube 21.

The volume of liquid poured in any given serving operation is a function of, inter alia, the volume of measuring chamber 13a and the distance between opening 17 of siphon cup 16 and the top opening 25 of pouring spout 24 (as viewed in a pouring position), and the distance between the opening 17 and the adjacent wall of bulbous body 11.

A short distance will limit the time it takes for measuring chamber 13a to fill to opening 25 before a siphon operation begins. Accordingly, replacement of a pouring spout 24 with another spout will allow for predetermined variations in the amount of liquid to be poured by dispenser. It is necessarily important, however, that the length of spout 24 within the body 11 be the only variable and the two methods of securing a spout 24 discussed above not only provide secure positioning but allow for quick and easy replacement of one spout 24 with another one.

A major difficulty with many liquid dispensers is clogging particularly of the flow passages used primarily for air and regulating apparatus due to the drying of the fluid leaving any residue. This is particularly troublesome in dispensers using syrups or other high viscosity mixing liquids. A substantially complete drainage of the liquid is illustrated in FIGS. 1 and 3 and previously described restriction aperture 34 and with the smooth, lowered opening 22 with respect to projection 20 and a smooth surface between the surfaces 13, 15 that define receiving chamber 14 and opening 29.

Figure 5:
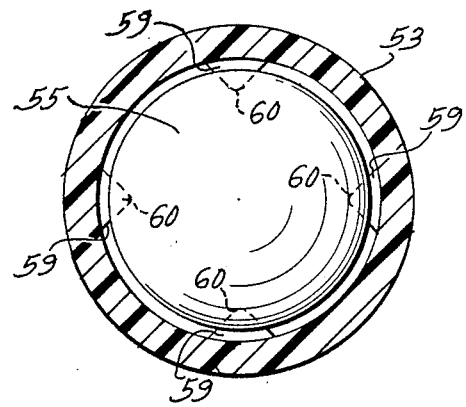
FIG. 5 is a cross-sectional view taken on the line 5—5 of FIG. 4.

FIGS. 4 and 5 illustrate an alternate restriction aperture in tube 21 to that discussed above. A ball-in-cage flow restrictor 51 is comprised of a neck 54 sized to fit over and frictionally engage the end of air supply tube 52 which is identical to tube 21, except for the omission of restriction aperture 34. An integral cage 53 is connected to neck 54 and is sized to accommodate movement of ball 55 in the vertical direction. The passage area between the interior cage walls 56 and the surface of ball 55 is less than the cross-sectional area of tube 52. The upper interior surface of cage 54 is convergent inward to form upper stop means 57 against which rests ball 55 when the dispenser 10 is in the pouring position and aperture 57a for fluid flow therethrough. The inward surfaces of stop means 57 are shaped to substantially match the surface curvature of ball 55. The lower stop means 58 for ball 55 is comprised of four inwardly extending protrusions 59 preferably shaped triangularly so that the surface of ball 55 makes minimal contact with the innermost apex 60 of each protrusion 59. Accordingly, there is minimum surface area to which liquid may adhere and/or dry out which may be detrimental to proper operation thereof.

The neck 54 contains at least one laterally extending small aperture 61 for the passage of air into the bottle via tube 52 during the beginning of a pouring cycle. The small aperture 61, but relatively large as compared to the restricted walls 38 in tube 21 allows for rapid air entry and thus a rapid pouring action. The ball 55 rests against upper stop 57 during pouring and thus all fluid must pass through tube 27. This feature thus minimizes the likelihood of fluid leaving dispenser 10 via spout 24 during the initial tilting of the bottle and the resultant blocking of air entry which slows operation. When the bottle is returned to the vertical position, ball 55 rests upon the apex 60 of each protrusion 59 and liquid may drain into the bottle in the passage between the ball 55 and cage surface 56.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to be secured by Letters Patent of the U.S. is:

1. In a siphon dispenser device for dispensing liquid from a container in predetermined amounts having a hollow body, said body having an interior partial partition to form a liquid receiving chamber and a measuring chamber communicating with each other, a tubular and vertically disposed lower neck portion communicating between said receiving chamber and an aperture of a fluid container holding liquid to be dispensed, an upper elongated tubular pouring spout having an inner end communicating with said measuring chamber, said body having an air vent communicating between the hollow of said body and exteriorly thereof, tubular siphon means located within said body about said inner end of said pouring spout to periodically siphon a predetermined amount of liquid into a serving container, said tubular neck portion including an elongated air tube having a lower end portion, said tubular neck portion further including a tubular fluid conduit communicating with said liquid receiving chamber, the improvement comprising aperture restriction means being located adjacent said lower end portion of said air tube and having a ball sized to be freely movable vertically therein, upper and lower stop means in said lower end portion of said air tube for restricting the movement of said ball therein, a lateral aperture located in said tube spaced above said upper stop means.

2. The siphon dispenser as in claim 1 wherein said spout includes a laterally extending shoulder at a predetermined distance from said inner end of said spout, said body having a boss with a passage for receiving said spout therethrough, cap means for tightly forcing said shoulder against said boss for sealing against leakage between said spout and boss.

3. The siphon dispenser as in claim 2 further including sealing means between said cap means and said shoulder to seal said shoulder against said boss.

4. The siphon dispenser as in claim 3 wherein said sealing means is an 0-ring formed of resilient material.

5. The siphon dispenser as in claim 1 further including a plurality of said pouring spouts, each said spout having a different length of tube between said shoulder and said inner end for altering the amount of liquid poured from said dispenser with each said spout.

6. The siphon dispenser as in claim 5 wherein said lower stop means includes a plurality of inwardly directed protrusions spaced to allow rapid drainage of any liquid contained in said tube into a fluid container onto which said dispenser is mountable.

7. The siphon dispenser as in claim 6 wherein said protrusions are triangular in shape with an inwardly directed apex.

8. The siphon dispenser as in claim 6 wherein said apexes are sized to provide minimum surface contact with said ball when said ball is resting thereon to minimize entrapment and adhesion of liquid between said ball and said apex.

9. In a siphon dispenser for dispensing liquid from a container in predetermined amounts having a hollow body, said body having an interior partial partition to form a liquid receiving chamber and a measuring chamber communicating with each other, a tubular and vertically disposed lower neck portion communicating between said receiving chamber and an aperture of a container holding liquid to be dispensed, an upper elongated tubular pouring spout having an inner and in communication with said measuring chamber, said body having an air vent communicating between the hollow of said body and exteriorly thereof, tubular siphon means located within said body about said inner end of said pouring spout to periodically siphon a predetermined amount of liquid into a serving container, said tubular neck portion including an elongated air tube having a lower end portion, said tubular neck portion further including a tubular fluid conduit communicating with said receiving chamber, the improvement comprising an aperture restriction means located in said air tube and including an interiorly disposed circumferential elongated shoulder having an upper end portion and a lower end portion, said lower end portion having an inwardly tapered smooth inner surface tapering outwardly from generally medially of said shoulder to its lower end to minimize the adhesion of liquid thereon when said air tube is in a generally vertical position with any liquid thereon draining therefrom to open and maintain said air tube to the free flow of air therethrough, said circumferential shoulder having a very small passage generally medially thereof inhibiting the free flow of liquid therethrough so that air may enter a container holding liquid to substantially increase the flow of liquid therefrom during dispensing via said dispenser, said upper end portion of said shoulder including a smooth inner surface tapering from said air tube adjacent its upper end inwardly to said very small passage.

10. The siphon dispenser as in claim 9 further including another pouring spout, each of said spouts having a different length of tube between respective said shoulder and respective said inner end for selecting the amount of liquid poured from said dispenser with each of said spouts.

11. The siphon dispenser as in claim 10 wherein each said spout includes a laterally extending shoulder at different predetermined distances from respective said inner ends of respective said spouts, said body having a boss with a passage for receiving a selective one of said spouts therethrough, cap means for tightly forcing said shoulder of said one spout against said boss for sealing against leakage between said one spout and said boss.

12. The siphon dispenser as in claim 9 wherein said upper end portion and said passage and said lower end portion form an hour-glass passageway defined by said elongated shoulder.

* * * * *